United States Patent Office 2,999,790
Patented Sept. 12, 1961

2,999,790
STABLE ALUMINUM HYDROXIDE SUSPENSION
Charles E. Alford, Bethlehem, N.Y., assignor to Sterling Drug Inc., New York, N.Y., a corporation of Delaware
No Drawing. Filed Aug. 24, 1959, Ser. No. 835,435
6 Claims. (Cl. 167—55)

This invention relates to an aqueous gastric antacid preparation comprising aluminum hydroxide and a hexitol as a stabilizing agent to prevent thickening and hardening, and to the method of forming said preparation.

Preferred embodiments of my invention contain aluminum hydroxide gel as the antacid and sorbitol or mannitol as the stabilizing agent. Aluminum hydroxide gel as defined in volume XIV of The Pharmacopeia of the United States (page 28) is a suspension containing the equivalent of not less than 3.6% and not more than 4.4% of aluminum oxide in the form of aluminum hydroxide and hydrated oxide, and is well known as an article of commerce as a white, gelatinous, free-flowing homogenous suspension containing about 5.5 to 6.7% aluminum hydroxide. Sorbitol is also known as D-sorbitol, sorbit, sorbol or D-glucitol; mannitol is also known as D-mannitol, mannite or manna sugar.

Numerous aqueous aluminum hydroxide preparations for treating gastric hyperacidity and for use in alleviating pain and hastening healing in duodenal and gastric ulcers are commercially available. However, many of these preparations have the disadvantage of irreversibly thickening and finally hardening when stored under warm conditions. This makes it difficult, if not impossible, to use such a preparation, in particular, to use it by the commonly employed continuous drip technique in cases of severe ulcer pain.

Available literature contained no suggestion of what to do about solving this problem of how to prevent the thickening and hardening of aqueous aluminum hydroxide preparations on storage. About 1940 one worker in the field, K. F. Stephenson, avoided the problem by preparing a dried aluminum hydroxide composition. In U.S. Patent 2,211,745 Stephenson discloses and claims a process for the preparation of his dried composition which comprises evaporating to substantial dryness an aqueous suspension of a carbohydrate and colloidal aluminum hydroxide. His preferred carbohydrate was cane sugar, i.e., sucrose, and the only aqueous suspension specifically shown as exemplifying his process contained this preferred carbohydrate. Other carbohydrates named were dextrose, starch, gum acacia, sorbitol and gum tragacanth. Among the dried compositions listed in tabular form is one containing 33% aluminum hydroxide and 67% sorbitol. There is no teaching that the selection of sorbitol, alone of all of the carbohydrates mentioned by Stephenson as useful in preparing aqueous suspensions to be evaporated, would yield shelf-stable suspensions. In other words, Stephenson does not show the concept that aqueous aluminum hydroxide suspensions could be shelf-stabilized by the use of one carbohydrate selected from his list of carbohydrates functionally equivalent for the purpose of enabling him to prepare a dried product retaining the acid neutralizing power of the original colloid. Stephenson made his suspension merely for the purpose of mixing the carbohydrate and aluminum hydroxide and his object was to make a dry preparation. He clearly fails to appreciate that his suspension would be stable or, specifically, that it would be stable against thickening and hardening on storage. In fact, as shown hereinbelow, the one specific suspension of Stephenson containing his preferred carbohydrate, i.e., sucrose, is not stable against thickening and hardening.

I have now found that this troublesome thickening and hardening can be prevented by incorporating a relatively small quantity of a hexitol, e.g., sorbitol or mannitol, in the preparation. I have found that as little as 0.5% of a hexitol is capable of effecting said stabilization. Quantities up to about 7% of the hexitol were found to produce preparations that retained an original colloidal liquid character even when stored at elevated temperatures, at which corresponding unprotected preparations, i.e., containing no hexitol, readily thickened and hardened. My antacid preparations contain about 86 to 94% (parts by weight) of water. A preferred embodiment of my invention contains only about one and one-half parts by weight of sorbitol, about six parts by weight of gelatinous aluminum hydroxide and about 92 parts by weight of water.

In formulating the composition of my invention the aluminum hydroxide is dispersed in the aqueous suspending medium. That aqueous suspending medium may be water or it may be water to which stabilizing and flavoring components already have been added. Thus, the sequence of addition of components to the water is not critical.

The following example will illustrate embodiments of my invention without, however, limiting it thereto.

*Example*

An aluminum hydroxide gel formulation was prepared by dispersing gelatinous aluminum hydroxide in water. After forming the dispersion, the other components were added and mixed well to form the following formulation:

| | | |
|---|---|---|
| Aluminum hydroxide (gelatinous) | parts by wt | 6.0 |
| Sodium benzoate | do | 0.5 |
| Saccharin soluble | do | 0.005 |
| Oil peppermint, U.S.P. | parts by vol | 0.005 |
| Sorbitol | parts by wt | 1.4 |
| Water, distilled, q.s. ad | do | 100.0 |

Alternatively, the above formulation can be prepared by dispersing the aluminum hydroxide in water to which the other components already have been added. Immediately prior to bottling this formulation and sealing the bottles, 10 parts per million by weight of available chlorine as sodium hypochlorite solution were added. Bottled samples of this formulation when kept at 45° C. for twenty-three weeks retained their original colloidal liquid character.

Other equally satisfactory formulations were prepared using 2.8, 4.2, 5.6 and 7.0 parts of sorbitol; or by replacing sorbitol with corresponding quantities of mannitol; or by replacing three parts of water with glycerine and using 0.7, 1.4, 2.1 or 2.8 parts of sorbitol. All of these formulations retained their original colloidal liquid character when stored in sealed bottles at 45° C. for twenty-three weeks.

Substitution of sorbitol or mannitol in the above aluminum hydroxide gel formulations with equivalent quantities of sucrose, dextrose, propylene glycol, glycerin or polyethylene glycol 400 and storage of the resulting preparations under the same conditions yielded unsatisfactory results. For example, such preparations with 5% sucrose, 5% propylene glycol or 5% polyethylene glycol 400 had solidified after only one week at 45° C., and a corresponding preparation with 5% dextrose when stored at 45° C. had thickened after one week and had darkened in color after five weeks.

An aluminum hydroxide gel formulation identical with the above-described preparations of my invention but containing no hexitol when stored in sealed bottles at 45° C. as above was found to thicken appreciably after only a few days of storage; actually, the thickening progressed each day until at the end of one week of storage at 45° C. it was practically impossible to pour or pipette samples of the formulation. As well as differing markedly from the stable preparations of my invention, this also is in marked contrast to the behavior of an aqueous colloidal liquid gastric preparation comprising about the same amount (7–8.5%) of magnesium hydroxide in place of the aluminum hydroxide and containing no hexitol. This latter preparation retained its original colloidal liquid character even when stored at as high as 60° C. for as long as seven weeks.

Other aqueous gastric antacid preparations can be prepared in accordance with the foregoing description by using, in addition to the essential ingredients of gelatinous aluminum hydroxide and a hexitol, other antacids, flavoring agents, sweetening agents, preserving agents, etc., provided they are mutually compatible with the essential ingredients of the preparation.

This application is a continuation-in-part of my copending application, Serial Number 588,258, filed May 31, 1956, which in turn is a continuation-in-part of my application, Serial Number 401,078, filed December 29, 1953, both now abandoned.

I claim:

1. A colloidal liquid gastric antacid preparation comprising about 5.5 to 6.7% of gelatinous aluminum hydroxide in aqueous suspension and having incorporated therein about 0.5 to 7% of a hexitol as a stabilizing agent to prevent thickening and hardening.

2. A colloidal liquid gastric antacid preparation comprising about 5.5 to 6.7% of gelatinous aluminum hydroxide in aqueous suspension and having incorporated therein about 0.5 to 7% of sorbitol as a stabilizing agent to prevent thickening and hardening.

3. A colloidal liquid gastric antacid preparation comprising about 5.5 to 6.7% of gelatinous aluminum hydroxide in aqueous suspension and having incorporated therein about 0.5 to 7% of mannitol as a stabilizing agent to prevent thickening and hardening.

4. An aqueous colloidal liquid gastric antacid preparation comprising about six parts by weight of gelatinous aluminum hydroxide, about one and one-half parts by weight of sorbitol as a stabilizing agent to prevent thickening and hardening, and about ninety-two parts by weight of water.

5. The method of forming a stable liquid antacid preparation consisting of dispersing about 5.5 to 6.7% of gelatinous aluminum hydroxide in an aqueous suspending medium and stabilizing said suspension to prevent thickening and hardening by incorporating in said suspension about 0.5 to 7% of a hexitol.

6. The method of forming a stable liquid antacid preparation consisting of dispersing about six parts by weight of gelatinous aluminum hydroxide in an aqueous suspending medium which contains about ninety-two parts by weight of water and stabilizing said suspension to prevent thickening and hardening by incorporating in said suspension about one and one-half parts by weight of sorbitol.

References Cited in the file of this patent

UNITED STATES PATENTS

| | | |
|---|---|---|
| 2,211,745 | Stephenson | Aug. 13, 1940 |
| 2,755,220 | Alford | July 17, 1956 |

OTHER REFERENCES

Speel, Am. J. Pharmacy, April 1941, pp. 134–141.